(12) United States Patent
Yang et al.

(10) Patent No.: US 12,370,602 B2
(45) Date of Patent: Jul. 29, 2025

(54) NITIHF HIGH TEMPERATURE SHAPE MEMORY ALLOY WITH TWO-WAY SHAPE MEMORY EFFECT, AND 4D PRINTING METHOD AND APPLICATION THEREOF

(71) Applicants: South China University of Technology, Guangdong (CN); GUANGDONG HUAYI PLUMBING FITTINGS INDUSTRY CO., LTD., Guangdong (CN)

(72) Inventors: Chao Yang, Guangdong (CN); Hongwei Ma, Guangdong (CN); Yanfei Ding, Guangdong (CN); Weisi Cai, Guangdong (CN); Xiao Yu, Liaoning (CN)

(73) Assignees: South China University of Technology, Guangzhou (CN); GUANGDONG HUAYI PLUMBING FITTINGS INDUSTRY CO., LTD., Kaiping (CN)

( * ) Notice: Subject to any disclaimer, the term of this patent is extended or adjusted under 35 U.S.C. 154(b) by 255 days.

(21) Appl. No.: 17/976,902

(22) Filed: Oct. 31, 2022

(65) Prior Publication Data
US 2023/0415234 A1    Dec. 28, 2023

(30) Foreign Application Priority Data

Jun. 24, 2022   (CN) .......................... 202210723501.7

(51) Int. Cl.
*B22F 10/28* (2021.01)
*B22F 9/08* (2006.01)
(Continued)

(52) U.S. Cl.
CPC .............. *B22F 10/28* (2021.01); *B22F 9/082* (2013.01); *B22F 10/366* (2021.01); *B33Y 10/00* (2014.12);
(Continued)

(58) Field of Classification Search
CPC ........ B22F 10/28; B22F 9/082; B22F 10/366; B22F 2009/0836; B22F 5/00; B22F 9/12;
(Continued)

(56) References Cited

U.S. PATENT DOCUMENTS

| 5,114,504 A | 5/1992 | AbuJudom, II et al. |
| 2024/0263339 A1* | 8/2024 | Körner et al. .......... C30B 29/52 |

OTHER PUBLICATIONS

Nematollahi et al., Laser Powder Bed Fusion of NiTiHf High-Temperature ShapeMemory Alloy: Effect of Process Parameters on the Thermomechanical Behavior, Metals 2020, 10, 1522 (Year: 2020).*

(Continued)

*Primary Examiner* — Rebecca Janssen

(57) ABSTRACT

The invention belongs to the technical field of shape memory alloys and additive manufacturing, and discloses a NiTiHf high temperature shape memory alloy with two-way shape memory effect and a 4D printing method and application thereof. The 4D printing method includes alloy powder processing, model building and substrate preheating, and 4D printing forming. The present invention patent is based on the design concept of reducing thermal gradient and the environmental friendly concept of clean production. It adopts substrate preheating combined with low laser power and low scanning speed laser powder bed fusion technology or low preheating temperature electron beam powder bed fusion technology to improve the formed alloy. The lattice compatibility with the NiTi substrate reduces the residual stress of the formed sample, and produces no cracks, no obvious holes, density ≥99%, high phase transformation (Continued)

temperature, excellent tensile mechanical properties and two-way shape memory effect.

7 Claims, 2 Drawing Sheets

(51) Int. Cl.
*B22F 10/366* (2021.01)
*B33Y 10/00* (2015.01)
*B33Y 40/10* (2020.01)
*B33Y 70/00* (2020.01)
*C22C 1/02* (2006.01)
*C22C 30/00* (2006.01)

(52) U.S. Cl.
CPC ............... *B33Y 40/10* (2020.01); *B33Y 70/00* (2014.12); *C22C 1/02* (2013.01); *C22C 30/00* (2013.01); *B22F 2009/0836* (2013.01)

(58) Field of Classification Search
CPC .... B22F 9/14; B22F 2999/00; B22F 2202/13; B22F 2998/10; B22F 7/08; B22F 2202/07; B22F 2201/11; B33Y 10/00; B33Y 40/10; B33Y 70/00; B33Y 80/00; C22C 1/02; C22C 30/00; C22C 1/0433; C22C 1/0458; C22C 27/00; Y02P 10/25
See application file for complete search history.

(56) References Cited

OTHER PUBLICATIONS

Gibson, I., Rosen, D., Stucker, B., Khorasani, M. (2021), Additive Manufacturing Technologies, Springer, Cham., available online Nov. 11, 2020 (Year: 2020).*

Ma et al., Enhanced thermal cycle stability and shape memory effect in NiTiHf shape memory alloys fabricated by laser powder bed fusion, Additive Manufacturing 92 (2024) 104375 (Year: 2024).*

Guher P. Toker et al., Shape memory behavior of NiTiHf alloys fabricated by selective laser melting, Scripta Materialia, 2020, pp. 361-365, vol. 178.

Mohammadreza Nematollahi et al., Laser Powder Bed Fusion of NiTiHf High-Temperature Shape Memory Alloy: Effect of Process Parameters on the Thermomechanical Behavior, Metals, Nov. 17, 2020, vol. 10.

Quan Zhou et al., Selective electron beam melting of NiTi: Microstructure, phase transformation and mechanical properties, Materials Science & Engineering A, 2019, pp. 290-298, vol. 744.

Yuyong Chen, Selective electron beam melting of TiAl alloy: Microstructure evolution, phase transformation and microhardness, Materials Characterization, 2018, pp. 584-592, vol. 142.

* cited by examiner

NITIHF HIGH TEMPERATURE SHAPE MEMORY ALLOY WITH TWO-WAY SHAPE MEMORY EFFECT, AND 4D PRINTING METHOD AND APPLICATION THEREOF

CROSS-REFERENCE TO RELATED APPLICATION

The present application claims priority from Chinese Patent Application No. 202210723501.7 filed on Jun. 24, 2022, the contents of which are incorporated herein by reference in their entirety.

TECHNICAL FIELD

The invention belongs to the technical field of shape memory alloys and additive manufacturing, and in particular relates to a NiTiHf high temperature shape memory alloy with two-way shape memory effect, and 4D printing method and application thereof.

TECHNICAL BACKGROUND

Shape memory alloys are a class of cutting-edge materials with shape memory effect which integrate superelasticity, sensing and actuation. As a typical representative of shape memory alloys, NiTi shape memory alloys with near equiatomic ratio have excellent shape memory effect and superelasticity, corrosion resistance, biocompatibility, high damping characteristics, low elastic modulus and good energy storage and shock absorption function. It has been widely developed in various engineering fields and biomedicine, such as pipe joints, unlocking structures, actuators, interventional stents, artificial joints and orthodontic wires, etc. It is a smart metallic material with great commercial value. However, the phase transformation temperature of NiTi shape memory alloys, which are currently the most widely used in commercial use, is lower than 100° C. During the thermo-mechanical cycling that requires stable shape memory effect or superelastic behavior, the phase transformation temperature will be further reduced, which makes their application scenarios only be limited to low temperature environments, such as biomedical implants and drives, etc., not suitable for high temperature environments such as aerospace, deep space exploration, solar cell arrays, oil mine detection and fire alarms, such as an aero-engine intelligent air cooler, a space shuttle solid boosters equipment, a satellite release device, a deformable cover for changeable aero-wings, a current overload protector, a high driving force device, a nuclear power plant safety control valve, an underground oil and gas flow control valve and a fire alarm device.

By substituting Ni or Ti with a third element (Hf, Zr, Pt, Pd, and Au), NiTi-based high temperature shape memory alloys may be developed. The phase transformation temperature of NiTi-based high temperature shape memory alloy is higher than 120° C., which makes it widely used in aerospace, deep space exploration and many other industries. Among the third elements currently designed, Hf has a wide control range for the phase transformation temperature of NiTi-based high temperature shape memory alloys, low cost, and excellent shape memory effect and superelasticity, so it has attracted the attention of researchers. However, NiTi-based high-temperature shape memory alloys, including NiTiHf, have physical properties such as high reactivity, low thermal conductivity, stress-induced martensitic transformation, springback effect, hardening processing, burr formation, and adhesion. It increases the technical difficulty of preparing bulk alloys and parts by traditional methods such as casting, forging and machining. In recent years, with the upgrading of high-end equipment for high-temperature environments such as aerospace, deep space exploration, solar cell arrays, oil mine detection, and fire alarms, various NiTi-based high-temperature shape memory alloys and their structural and functional integrated parts are urgently needed. However, the traditional methods such as casting, forging and machining that are commonly used at present are difficult to form NiTi-based high temperature shape memory alloys with complex structures and near-net shape and their structural and functional integrated components. This has become a "bottleneck" problem that restricts the development of high-end equipment.

As a cutting-edge disruptive technology, 4D printing technology refers to the ability of 3D printed smart structures to be stimulated by external factors such as light, electricity, magnetism and heat, to realize the autonomous regulation of the shape, performance or function of components in time and space. The fourth "D" refers to the time or space dimension. 4D printing technology may make the shape, performance and function of components realize controllable changes in time and space dimensions through active design of material properties or structural configuration, and realize near-net shape preparation of complex intelligent components, to meet the high-end application requirements of controllable deformation, change of nature and change of function of high-end equipment. Therefore, the 4D printing technology of the present invention is to form NiTiHf high temperature shape memory alloy and its structural and functional integrated components through the laser/electron beam powder bed fusion and additive manufacturing. It is worth noting that the addition of Hf element will lead to a higher melting point, greater brittleness (U.S. Pat. No. 5,114,504A), and greater thermal sensitivity of NiTi alloys. As a result, NiTiHf high temperature shape memory alloys are more sensitive to the process parameters of 4D printing additive manufacturing, and are prone to crack and form holes.

According to the search on Web of Science, there are few reports on the 4D printing additive manufacturing of NiTiHf high temperature shape memory alloys. Document 1 (Scripta Materialia 178 (2020) 361-365) used low laser power process parameters (laser power P=100 W, scanning speed v=400 mm/s, scanning spacing h=140 μm, bulk energy density E=60 J/mm$^3$) and high laser power process parameters (laser power P=250 W, scanning speed v=466 mm/s, scanning spacing h=140 μm, bulk energy density E=128 J/mm$^3$) for the first time to form $Ni_{50.4}Ti_{29.6}Hf_{20}$ alloy. The austenitic transformation end temperature $A_f$ of $Ni_{0.4}Ti_{29.6}Hf_{20}$ alloy is 160° C. and 327° C. respectively due to two different process parameters. However, there are a certain number of pores and irregular unwelded pores inside the alloys formed by low laser power. Alloys formed by high laser power have obvious cracks, which are very harmful to mechanical properties and shape memory effects. Document 2 (Metals 10 (2020) 1522) explored the effect of different laser power (≥100 W), scanning speed (≥200 mm/s) and scanning spacing on the formability of $Ni_{50.4}Ti_{29.6}Hf_{20}$ alloy. It is pointed out that the optimum laser heat input of the crack-free as-printed alloy is about 60-100 J/mm$^3$. However, the alloys formed by these parameters also have a certain number of microscopic defects such as pores and microcracks.

The reason is that the NiTiHf high temperature shape memory alloy is more brittle and has lower fracture toughness than the NiTi shape memory alloy, and the laser power, scanning speed and energy input have a significant effect on the performance of the components. If the laser power is too low, there is not enough energy to fully melt and resolidify the metal powder, which will cause the unmelted part to become inclusions, form holes and cracks in the parts. It will also lead to an increase in crystal orientation difference, uneven temperature field, and cracking of parts when the scanning speed is too high; but it will cause burning of the additive manufactured alloy, the larger heat-affected zone, and therefore cracking when the scanning speed is too slow. In addition, excessive energy input will cause the volatilization of Ni element and form certain pores; on the contrary, insufficient energy input will lead to the formation of irregular unfused pores inside the alloy. Further, the scanning strategy also has an important influence on the defects, for example, the change of the scanning angle between layers has little effect on the pores, but has a significant effect on the cracks. Ultimately, these cracks and holes will greatly deteriorate the mechanical and functional properties of 4D print additive manufactured NiTiHf high temperature shape memory alloy products. For additive manufactured parts, hot isostatic pressing is currently effective for post-processing to reduce cracks in the part. The so-called hot isostatic pressing technology is a process that applies equal pressure in all directions to the metal under high temperature and high pressure at the same time, so that the parts may be sintered and densified. However, this method may only close cracks inside the additive manufactured part and cannot eliminate cracks on the surface of the manufactured part. In addition, the preheating temperature for the electron beam powder bed fusion of NiTiHf high temperature shape memory alloy is generally 750 to 1100° C. (Document 3: Materials Science & Engineering A 744 (2019) 290-298, Document 4: Materials Characterization 142 (2018) 584-592). Excessive preheating temperature will prolong the production period, increase the production cost, and is not conducive to clean production.

In view of this, if the appropriate process window and scanning strategy are selected, the defects such as pores and cracks in the additive manufactured NiTiHf high temperature shape memory alloys may be largely overcome. High-performance NiTiHf high-temperature shape memory alloys with no pores, no cracks, nearly full density (>99%), high phase transformation temperature, good mechanical properties and a two-way shape memory effect may be produced by 4D printing, in order to expand the service requirements of NiTiHf high temperature shape memory alloys in aerospace, deep space exploration, solar cell arrays, oil mine detection and fire alarm devices in high temperature environments. It will have important theoretical and engineering significance.

SUMMARY OF THE INVENTION

The primary objective of the present invention is to provide a 4D printing method of NiTiHf high temperature shape memory alloys with two-way shape memory effect. The printing method may produce NiTiHf high temperature shape memory alloys with no cracks, no obvious holes, density ≥99%, high phase transformation temperature, and good stretchability and mechanical properties, and with two-way shape memory effect.

The second objective of the present invention is to provide a NiTiHf high temperature shape memory alloys with two-way shape memory effect prepared by the above method.

The third objective of the present invention is to provide the application of the above-mentioned NiTiHf high temperature shape memory alloys with two-way shape memory effect in the field of high temperature.

The primary objective of the present invention is achieved through the following technical solutions:

A 4D printing method of NiTiHf high temperature shape memory alloys comprising:
(1) powder processing: preparing and vacuum smelting high-purity titanium, high-purity nickel and high-purity crystalline hafnium according to a selected atomic percentage to obtain NiTiHf alloy rods, preparing NiTiHf alloy powder by the electrode induction-melting gas atomization (EIGA) method or the plasma rotating electrode atomization method, and sieving to obtain NiTiHf alloy powder with a selected size range;
(2) constructing a model and preheating a substrate: building a three-dimensional model of structural parts to be prepared, completing a slicing process and generating a print file; the substrate is a NiTi alloy substrate and preheating the NiTi alloy substrate;
(3) forming a 4D printing: the NiTiHf alloy powder sieved in step (1) is formed through a laser powder bed fusion 4D printing additive manufacturing with low laser power and low scanning speed, or by an electron beam powder bed fusion 4D printing additive manufacturing with low preheat temperature, to obtain a NiTiHf high temperature shape memory alloy with a two-way shape memory effect.

In one form, the selected atomic percentage of the NiTiHf alloy rods in step (1) is: Ni 50.1 to 52.5 at. %, Hf 19.0 to 22.5 at. %, and a remaining is Ti.

In one form, the electrode induction-melting gas atomization method in step (1) is as follows:
heating the NiTiHf alloy rods to between 1450 to 1750° C. by an electrode induction; obtaining the NiTiHf alloy powder by atomizing the NiTiHf alloy rods with high-purity argon gas, an atomization pressure is 2.5 to 4.5 MPa, a supplemental gas pressure is 0.05 to 0.2 MPa, the atomizing gas temperature is 30 to 45° C., a melting power is 15 to 25 kW, and an entire environment is protected by argon.

In one form, the plasma rotating electrode atomization method in step (1) is:
melting the NiTiHf alloy rods by a high temperature plasma arc, obtaining the NiTiHf alloy powder by atomizing the melted NiTiHf alloy rods, a rotating speed of an electrode rod is 18000 to 24000 r/min, a plasma arc current intensity is 1500 to 2000 A, a feed rate is 0.8 to 1.2 mm/s, high-purity argon is used as an atomizing medium.

In one form, constructing the model in step (2) adopts 3D printing software MATERIALISE MAGICS 25.0 or AUTODESK NETFABB, and the slicing tool adopts EOS RP TOOLS or BUILDPROCESSOR module in MAGICS software.

In one form, the atomic percentage of the NiTi alloy substrate in step (2) is: Ni 49 to 50.8 at. %, the remainder is Ti, and the substrate preheating temperature is 120 to 500° C.

In one form, in step (3), a size of NiTiHf alloy powder suitable for the laser powder bed fusion 4D printing additive manufacturing with low laser power and low scanning speed is 15 to 75 μm, a preheating temperature of the substrate is 150 to 350° C.

In one form, in step (3), a size of NiTiHf alloy powder suitable for the electron beam powder bed fusion 4D printing additive manufacturing with low preheat temperature is 50 to 120 μm, a preheating temperature of the substrate is 300 to 500° C.

In one form, process conditions of the laser powder bed fusion 4D printing additive manufacturing with low laser power and low scanning speed in step (3) are: a low laser power of 45 to 100 W, a low laser scanning speed of 100 to 200 mm/s, a laser scanning spacing of 60 to 100 μm, a powder layer thickness of 20 to 50 μm, and a scanning strategy of 67° to 90° rotation between layers.

In one form, process conditions of the electron beam powder bed fusion 4D printing additive manufacturing with low preheat temperature in step (3) are: an accelerating voltage of 60 to 80 kV, a scanning current 15 of 25 mA, a scanning spacing 150 to 250 μm, a powder layer thickness t=50 to 100 μm, a scanning rate 800 to 1300 mm/s, and a scanning strategy of 67° to 90° rotation between layers.

The high-purity titanium, high-purity nickel and high-purity crystalline hafnium are smelted in a vacuum suspension smelting furnace in the present invention. A crucible-free electrode induction-melting gas atomization pulverizing equipment is used for electrode induction-melting gas atomization method (EIGA). The plasma rotating electrode atomization method adopts PREP-2500 industrial-grade plasma rotating electrode atomization and pulverizing equipment. The NiTiHf alloy powder obtained by the sieving treatment is suitable for 4D printing trough the laser powder bed fusion 4D printing additive manufacturing forming equipment and the electron beam powder bed fusion 4D printing additive manufacturing forming equipment. The laser powder bed fusion 4D printing additive manufacturing forming equipment and the electron beam powder bed fusion 4D printing additive manufacturing forming equipment of the present invention adopt CONCEPT LASER M2, EOSINT M280/290, SLM SOLUTION 125/280/500, FS121M/273M/421M, BLT-5320/A300+, ARCAM A2x/Q20 or QEBAM LAB200/MED200 etc. In the present invention, when the laser powder bed fusion 4D printing additive manufacturing forming equipment is used, the substrate preheating temperature is 150° C. to 350° C.; when the electron beam powder bed fusion 4D printing additive manufacturing forming equipment is used, the substrate preheating temperature is 300 to 500° C.

The second objective of the present invention is achieved through the following technical solutions:

A NiTiHf high temperature shape memory alloy with two-way shape memory effect prepared by the above method.

The NiTiHf high temperature shape memory alloy with two-way shape memory effect of the present invention has no cracks, no obvious holes, density ≥99%, end temperature of austenite transformation $A_f$≥320° C., the tensile strength is 820 to 1100 MPa, and the two-way shape memory strain is between 0.6 to 1.5%.

The third objective of the present invention is achieved through the following technical solutions:

An application of a NiTiHf high temperature shape memory alloy with two-way shape memory effect in high temperature field.

Specifically, the application including manufacturing an aero-engine intelligent air cooler, a space shuttle solid boosters equipment, a satellite release device, a deformable cover for changeable aero-wings, a current overload protector, a high driving force device, a nuclear power plant safety control valve, an underground oil and gas flow control valve and a fire alarm device etc.

The principle of the present invention is as follows: the present invention selects a NiTi alloy substrate with a phase transformation temperature $A_f$ of 15 to 30° C.±3° C., and the substrate is preheated to a temperature above the end temperature of B2 austenite transformation (120 to 500° C.). On the one hand, the thermal stress generated during the printing process is reduced, thereby reducing the cracking tendency, and on the other hand, the complete austenitization of the substrate may have better lattice compatibility with the NiTiHf alloy formed by the high energy input density during the printing process. Therefore, the wettability between the substrate and the NiTiHf alloy powder is improved, and the weldability is ensured. At the same time, the present invention adopts the scanning method of low laser power and low scanning speed, and adopts the scanning strategy of rotating 67° to 90° between layers. Under the premise that the alloy powder is completely melted and the nickel volatilization is low, residual stress of molded specimen is reduced and a NiTiHf high temperature shape memory alloy with high phase transformation temperature and excellent mechanical properties (density ≥99%) with two-way shape memory effect is prepared.

The preparation method of the present invention and the obtained product have the following advantages and beneficial effects:

(1) The NiTiHf high temperature shape memory alloy prepared by the present invention has no cracks, no obvious holes, the density is ≥99%, the end temperature of austenite transformation is $A_f$≥320° C., the tensile fracture strength is 820 to 1100 MPa, and the two-way shape memory strain ranges from 0.6% to 1.5%, and the formability, mechanical properties and shape memory effect are significantly better than the currently reported 4D printed NiTiHf alloys.

(2) In the present invention, NiTi alloy substrate is selected, and the substrate is preheated to above the end temperature of austenite transformation (120 to 500° C.), which may greatly reduce the thermal gradient and improve the lattice compatibility between the NiTi substrate and the forming alloy, and thus improve the wettability of the substrate and NiTiHf alloy powder, reduce thermal stress, and ensure weldability.

(3) The present invention adopts the scanning strategy of interlayer rotation of 67° to 90°, under the premise of ensuring that the alloy powder is completely melted and the nickel volatilization is low, the residual stress of the molded sample is reduced, and the formation of hot cracks is reduced.

(4) The preheating temperature of the substrate of the present invention is low, and the formed samples do not need to be subjected to stress relief annealing and hot isostatic pressing, which may greatly reduce energy consumption, improve production efficiency, reduce production costs, and have the effect of energy saving and environmental friendly.

(5) The present invention adopts 4D printing additive manufacturing process to prepare NiTiHf high temperature shape memory alloy with two-way shape memory effect. Compared with traditional manufacturing processes such as casting, forging and machining, it may be personalized according to the designed 3D model to realize the rapid manufacture of NiTiHf alloy parts with complex structure. It may greatly expand the application of NiTiHf high temperature shape memory alloys in high temperature applications such as an aero-engine intelligent air cooler, a space shuttle solid boosters equipment, a satellite release device, a deformable cover for changeable aero-wings, a current overload protector, a high driving force device, a nuclear power plant safety control valve, an underground oil and gas flow control valve and a fire alarm device etc.

DETAILED DESCRIPTION

Figure 1:
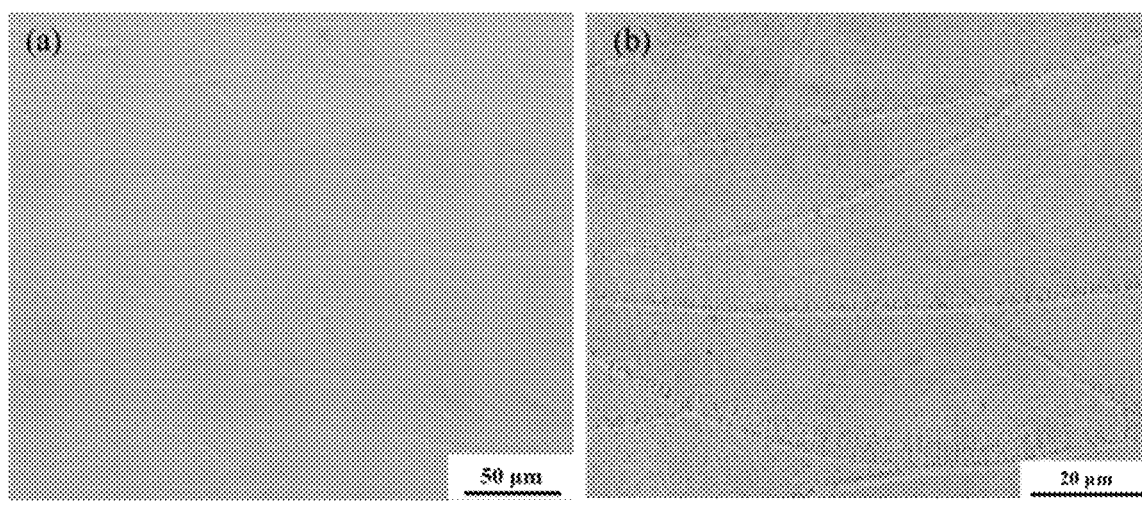
FIG. 1 is a scanning electron microscope image of the NiTiHf high temperature shape memory alloy with two-way shape memory effect prepared by 4D printing in Embodiment 1. (a) in FIG. 1 is a secondary electron image, and (b) in FIG. 1 is a backscattered electron image.

The present invention will be described in further detail below with reference to embodiments, but the embodiments of the present invention are not limited thereto.

Embodiment 1

(1) Powder processing: the ingredients are prepared according to the following NiTiHf atomic ratio: Ni 50.4 at. %, Ti 29.6 at. %, Hf 20 at. %. The NiTiHf alloy rods were smelted by suspension under vacuum conditions. The NiTiHf alloy rods were heated to 1650° C. by electrode induction using EIGA crucibleless electrode induction-melting gas atomization pulverizing equipment, and the alloy rods were atomized under the conditions of argon atomization pressure of 4 MPa and air supply pressure of 0.05 MPa. The obtained powder is collected and sieved to obtain an alloy powder with a particle size of 15 to 75 μm.

(2) Constructing a model and preheating a substrate: use 3D printing software MATERIALISE MAGICS 25.0 to build a 3D model of the structural parts to be prepared, use slicing tool EOS RP TOOLS to complete the slicing process and generate print files; the atomic percent element composition of the NiTi alloy substrate is: Ni 50.8 at. %, the remainder is Ti. The phase transformation temperature $A_f$ is 25±3° C., and the substrate preheating temperature is 200° C.

(3) forming a 4D printing: laser powder bed fusion equipment EOSINT M280 is used for 4D printing forming. The process parameters are as follow: laser power P=50 W, laser scanning speed v=110 mm/s, laser scanning distance h=80 μm, thickness of the powder layer t=30 μm, and the scanning strategy is a 670 rotation between layers. The specific forming steps are as follows: after the substrate is preheated to the target temperature, it is leveled, and then NiTiHf alloy powder with a thickness ranging from 60 to 100 μm is uniformly spread on the NiTi alloy substrate with a powder spreading device; then the NiTi alloy substrate is adjusted, the sliced data files are imported into the forming equipment EOSINT M280, the process parameters are set and the settings are saved; place NiTiHf alloy powder in the powder bin of the laser powder bed fusion equipment, seal the molding chamber, pump the molding chamber to less than 0.6 mbar with a vacuum pump, and send high-purity protective argon into the molding chamber until the oxygen content in the molding chamber is reduced to less than 0.1%. The laser starts printing according to the designed slice shape and laser scanning strategy; for each layer of powder (30 μm) in the first and second layers, the forming substrate drops by one layer of powder thickness (30 μm), and the laser melts the alloy powder twice per layer according to the set process parameters. Starting from the third layer, each layer of powder is melted by laser only once, and then the same thickness of powder is pre-set on the melted layer, and is melted again by the laser; the above steps are repeated until the preset size and shape of the alloy block are reached. The cooled shaped parts are cut from the substrate to obtain the formed alloy samples.

Figure 2:
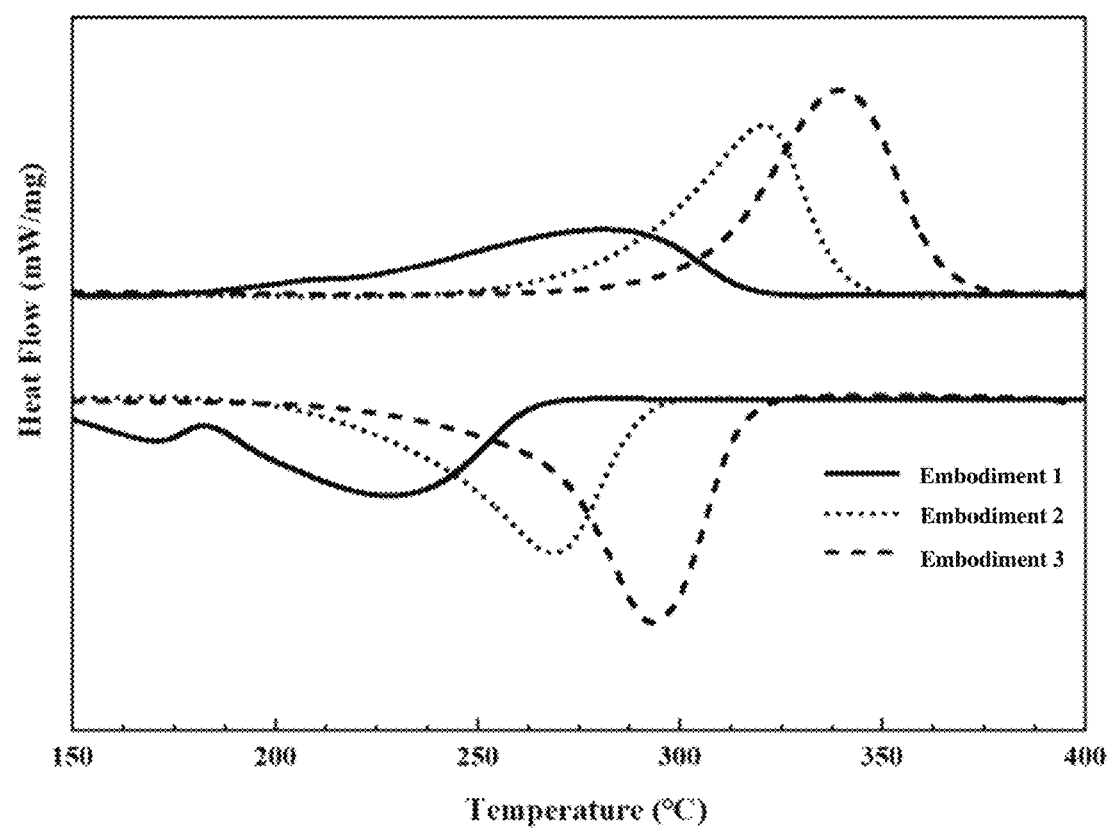
FIG. 2 shows the DSC curves of NiTiHf high temperature shape memory alloy with two-way shape memory effect prepared by 4D printing in Embodiment 1, Embodiment 2 and Embodiment 3.

The surface of the NiTiHf alloy sample formed in this example was polished, and its density was measured by the Archimedes drainage method (ASTM B962-2017). Microscopic analysis of the samples was carried out using a optical microscope LEICA DM 15000M and a field emission scanning electron microscope PHILIPS XL-30 FEG. The phase transformation temperature test was carried out using a differential scanning calorimeter NETZSCH DSC 3500 SIRIUS according to the international standard ASTM F2004-17. The room temperature compression test was performed using a universal material testing machine INSTRON 5967 according to the national standard GB/T 7314-2017 to examine mechanical properties. Two-way shape memory effect test was performed according to international standard ASTM: E3097-17. The results in FIG. 1 show that the density of the NiTiHf alloy prepared by 4D printing technology in this example is 99.5%. The molten pool is evenly distributed, and there are no cracks and obvious holes (Document 1 with obvious cracks and unwelded holes (FIG. 2)); the end temperature of austenite transformation $A_f$ is 320° C. (larger than the sample $A_f$ formed by 100 W laser power in Document 1 of only 160° C. and the sample $A_f$ formed by 250 W laser power is 327° C.). The tensile strength is 880 MPa (Document 1 has not performed a test, mainly due to the existence of obvious cracks and holes in the molded sample, and the tensile mechanical properties are poor). The two-way shape memory strain is 0.72% (the two-way shape memory strain of Document 1 and Document 2 was calculated by extrapolation, and the optimal value was 0.49%).

Embodiment 2

(1) Powder processing: the ingredients are prepared according to the following NiTiHf atomic ratio: Ni 50.3 at. %, Ti 29.2 at. %, Hf 20.5 at. %. The NiTiHf alloy rods were smelted by suspension under vacuum conditions. The NiTiHf alloy rods were heated to 1650° C. by electrode induction using EIGA crucibleless electrode induction-melting gas atomization pulverizing equipment, and the alloy rods were atomized under the conditions of argon atomization pressure of 5 MPa and air supply pressure of 0.15 MPa. The obtained powder is collected and sieved to obtain an alloy powder with a particle size of 15 to 75 μm.

(2) Constructing a model and preheating a substrate: use 3D printing software MATERIALISE MAGICS 25.0 to build the 3D model of the required structural parts and the slicing tool BUILDPROCESSOR module to complete the slicing process and generate print files; the atomic percent element composition of the NiTi alloy substrate is: Ni 50.3 at. %, the remainder is Ti. The phase transformation temperature $A_f$ is 20±3° C., and the substrate preheating temperature is 180° C.

(3) forming a 4D printing: laser powder bed fusion equipment EOSINT M280 is used for 4D printing forming. The process parameters are as follow: laser power P=60 W, laser scanning speed v=100 mm/s, laser scanning distance h=80 μm, thickness of the powder layer t=40 μm, and the scanning strategy is a 670 rotation between layers. The specific forming steps are as follows: after the substrate is preheated to the target temperature, it is leveled, and then NiTiHf alloy powder with a thickness ranging from 60 to 100 μm is uniformly spread on the NiTi alloy substrate with a powder spreading device; then the NiTi alloy substrate is adjusted, the sliced data files are imported into the forming equipment, the process parameters are set and the settings are saved; place NiTiHf alloy powder in the powder bin of the laser powder bed fusion equipment, seal the molding chamber, pump the molding chamber to less than 0.6 mbar with a vacuum pump, and send high-purity protective argon into the molding chamber until the oxygen content in the molding chamber is reduced to less than 0.1%. The laser starts printing according to the designed slice shape and laser scanning strategy; for each layer of powder (40 μm) in the first and second layers, the forming substrate drops by one layer of powder thickness (40 μm), and the laser melts the alloy powder twice per layer according to the set process parameters. Starting from the third layer, each layer of powder is melted by laser only once, and then the same thickness of powder is pre-set on the melted layer, and is melted again by the laser; the above steps are repeated until the preset size and shape of the alloy block are reached. The cooled shaped parts are cut from the substrate to obtain formed alloy samples.

The surface of the NiTiHf alloy sample formed in this example was polished, and its density was measured by the Archimedes drainage method (ASTM B962-2017). Microscopic analysis of the samples was carried out using a optical microscope LEICA DM 15000M and a field emission scanning electron microscope PHILIPS XL-30 FEG. The phase transformation temperature test was carried out using a differential scanning calorimeter NETZSCH DSC 3500 SIRIUS according to the international standard ASTM F2004-17. The room temperature compression test was performed using a universal material testing machine INSTRON 5967 according to the national standard GB/T 7314-2017 to examine mechanical properties. Two-way shape memory effect test was performed according to international standard ASTM: E3097-17. The results show that the density of the NiTiHf alloy prepared by 4D printing technology in this example is 99.6%. There are no cracks and obvious holes (Document 1 with obvious cracks and unwelded holes (FIG. 2)); the end temperature of austenite transformation $A_f$ is 320° C. (the sample $A_f$ formed by 100 W laser power in Document 1 is only 160° C. and the sample $A_f$ formed by 250 W laser power is 327° C.). The tensile breaking strength is 900 MPa (Document 1 has not performed a test, mainly due to the existence of obvious cracks and holes in the molded sample, and the tensile mechanical properties are poor). The two-way shape memory strain is 0.58% (the two-way shape memory strain of Document 1 and Document 2 was calculated by extrapolation, and the optimal value was 0.49%).

Embodiment 3

(1) Powder processing: the ingredients are prepared according to the following NiTiHf atomic ratio: Ni 50.6 at. %, Ti 30 at. %, Hf 19.4 at. %. The NiTiHf alloy rods were smelted by suspension under vacuum conditions. PREP-2500 industrial-grade plasma rotating electrode atomization pulverizing equipment is used to melt NiTiHf alloy bars through high temperature plasma arc. The rotating speed of the electrode rod was 18500 r/min, the plasma arc current intensity was 1800 A, the feed rate was 0.8 mm/s, and the atomizing medium was high-purity argon to atomize alloy bars. The obtained powder is collected and sieved to obtain an alloy powder with a particle size of 15 to 75 μm.

(2) Constructing a model and preheating a substrate: use 3D printing software MATERIALISE MAGICS 25.0 to build the 3D model of the required structural parts and the slicing tool BUILDPROCESSOR module to complete the slicing process and generate print files; the atomic percent element composition of the NiTi alloy substrate is: Ni 50.3 at. %, the remainder is Ti. The phase transformation temperature $A_f$ is 30±3° C., and the substrate preheating temperature is 250° C.

(3) forming a 4D printing: laser powder bed fusion equipment EOSINT M290 is used for 4D printing forming. The process parameters are as follow: laser power P=70 W, laser scanning speed v=100 mm/s, laser scanning distance h=100 μm, thickness of the powder layer t=30 μm, and the scanning strategy is a 900 rotation between layers. The specific forming steps are as follows: after the substrate is preheated to the target temperature, it is leveled, and then NiTiHf alloy powder with a thickness ranging from 60 to 100 μm is uniformly spread on the NiTi alloy substrate with a powder spreading device; then the NiTi alloy substrate is adjusted, the sliced data files are imported into the forming equipment, the process parameters are set and the settings are saved; place NiTiHf alloy powder in the powder bin of the EOSINT M290 laser powder bed fusion equipment, seal the molding chamber, pump the molding chamber to less than 0.6 mbar with a vacuum pump, and send high-purity protective argon into the molding chamber until the oxygen content in the molding chamber is reduced to less than 0.1%. The laser starts printing according to the designed slice shape and laser scanning strategy; for each layer of powder (30 μm) in the first and second layers, the forming substrate drops by one layer of powder thickness (30 μm), and the laser melts the alloy powder twice per layer according to the set process parameters. Starting from the third layer, each layer of powder is melted by laser only once, and then the same thickness of powder is pre-set on the melted layer, and is melted again by the laser; the above steps are repeated until the preset size and shape of the alloy block are reached. The cooled shaped parts are cut from the substrate to obtain the formed alloy samples.

The surface of the NiTiHf alloy sample formed in this example was polished, and its density was measured by the Archimedes drainage method (ASTM B962-2017). Microscopic analysis of the samples was carried out using a optical microscope LEICA DM 15000M and a field emission scanning electron microscope PHILIPS XL-30 FEG. The phase transformation temperature test was carried out using a differential scanning calorimeter NETZSCH DSC 3500 SIRIUS according to the international standard ASTM F2004-17. The room temperature compression test was performed using a universal material testing machine INSTRON 5967 according to the national standard GB/T 7314-2017 to examine mechanical properties. Two-way shape memory effect test was performed according to international standard ASTM: E3097-17. The results show that the density of the NiTiHf alloy prepared by 4D printing technology in this example is 99.3%. The molten pool is evenly distributed, and there are no cracks and obvious holes (Document 1 with obvious cracks and unwelded holes (FIG. 2)); the end temperature of austenite transformation $A_f$ is 365° C. (higher than the $A_f$ reported in Document 1). The tensile strength is 850 MPa (Document 1 has not performed a test, mainly due to the existence of obvious cracks and holes in the molded sample, and the tensile mechanical properties are poor). The two-way shape memory strain is 0.65% (the two-way shape memory strain of Document 1 and Document 2 was calculated by extrapolation, and the optimal value was 0.49%).

Embodiment 4

(1) Powder processing: the ingredients are prepared according to the following NiTiHf atomic ratio: Ni 51.8 at. %, Ti 28.8 at. %, Hf 19.4 at. %. The NiTiHf alloy rods were smelted by suspension under vacuum conditions. PREP-2500 industrial-grade plasma rotating electrode atomization pulverizing equipment is used to melt NiTiHf alloy bars through high temperature plasma arc. The rotating speed of the electrode rod was 20000 r/min, the plasma arc current intensity was 1950 A, the feed rate was 1.0 mm/s, and the atomizing medium was high-purity argon to atomize alloy bars. The obtained powder is collected and sieved to obtain an alloy powder with a particle size of 75 to 120 μm.

(2) Constructing a model and preheating a substrate: use 3D printing software MATERIALISE MAGICS 25.0 to build the 3D model of the required structural parts and the slicing tool BUILDPROCESSOR module to complete the slicing process and generate print files; the atomic percent element composition of the NiTi alloy substrate is: Ni 50.3 at. %, the remainder is Ti. The phase transformation temperature $A_f$ is 30±3° C., and the substrate preheating temperature is 400° C.

(3) forming a 4D printing: electron beam powder bed fusion equipment QEBAM LAB200 is used for 4D printing forming. The process parameters are as follow: the speed voltage is 60 kV, the scanning current is 20 mA, the scanning spacing is 150 μm, thickness of the powder layer t=80 μm, and the scan rate is 900 mm/s. The specific forming steps are as follows: after the substrate is preheated to the target temperature, it is leveled, and then NiTiHf alloy powder with a thickness ranging from 60 to 100 μm is uniformly spread on the NiTi alloy substrate with a powder spreading device; then the NiTi alloy substrate is adjusted, the sliced data files are imported into the forming equipment, the process parameters are set and the settings are saved; place NiTiHf alloy powder in the powder bin of the electron beam powder bed fusion equipment QEBAM LAB200, seal the molding chamber, pump the molding chamber to less than 0.6 mbar with a vacuum pump, and send high-purity protective argon into the molding chamber until the oxygen content in the molding chamber is reduced to less than 0.1%. The electron beam starts printing according to the designed slice shape and beam scanning strategy; for each layer of powder (80 μm) in the first and second layers, the forming substrate drops by one layer of powder thickness (80 μm), and the laser melts the alloy powder twice per layer according to the set process parameters. Starting from the third layer, each layer of powder is melted by laser only once, and then the same thickness of powder is pre-set on the melted layer, and is melted again by the laser; the above steps are repeated until the preset size and shape of the alloy block are reached. The cooled shaped parts are cut from the substrate to obtain the formed alloy samples.

The surface of the NiTiHf alloy sample formed in this example was polished, and its density was measured by the Archimedes drainage method (ASTM B962-2017). Microscopic analysis of the samples was carried out using a optical microscope LEICA DM 15000M and a field emission scanning electron microscope PHILIPS XL-30 FEG. The phase transformation temperature test was carried out using a differential scanning calorimeter NETZSCH DSC 3500 SIRIUS according to the international standard ASTM F2004-17. The room temperature compression test was performed using a universal material testing machine INSTRON 5967 according to the national standard GB/T 7314-2017 to examine mechanical properties. Two-way shape memory effect test was performed according to international standard ASTM: E3097-17. The results show that the density of the NiTiHf alloy prepared by 4D printing technology in this example is 99.1%. The molten pool is evenly distributed, and there are no cracks and obvious holes (Document 1 with obvious cracks and unwelded holes (FIG. 2)); the end temperature of austenite transformation $A_f$ is 380° C. (higher than the $A_f$ reported in Document 1). The tensile strength is 815 MPa (Document 1 has not performed a test, mainly due to the existence of obvious cracks and holes in the molded sample, and the tensile mechanical properties are poor). The two-way shape memory strain is 0.63% (the two-way shape memory strain of Document 1 and Document 2 was calculated by extrapolation, and the optimal value was 0.49%).

Comparative Example 1

(1) Powder processing: the ingredients are prepared according to the following NiTiHf atomic ratio: Ni 50.4 at. %, Ti 29.6 at. %, Hf 20 at. %. The NiTiHf alloy rods were smelted by suspension under vacuum conditions. The NiTiHf alloy bar was heated to 1650° C. by electrode induction using the EIGA crucibleless electrode induction-melting gas atomization pulverizing equipment, and the alloy bar was atomized under the conditions of argon atomization pressure of 5 MPa and air supply pressure of 0.15 MPa. The obtained powder is collected and sieved to obtain an alloy powder with a particle size of 15 to 75 μm.

(2) Constructing a model and preheating a substrate: use 3D printing software MATERIALISE MAGICS 25.0 to build the 3D model of the required structural parts and the slicing tool BUILDPROCESSOR module to complete the slicing process and generate print files; the atomic percent element composition of the NiTi alloy substrate is: Ni 50.3 at. %, the remainder is Ti. The phase transformation temperature $A_f$ is 15±3° C., and the substrate preheating temperature is 200° C.

(3) forming a 4D printing: laser powder bed fusion equipment EOSINT M280 is used for 4D printing forming. The process parameters are as follow: laser power P=90 W, laser scanning speed v=250 mm/s, laser scanning distance h=100 μm, thickness of the powder layer t=40 μm, and the scanning strategy is a 670 rotation between layers. The specific forming steps are as follows: after the substrate is preheated to the target temperature, it is leveled, and then NiTiHf alloy powder with a thickness ranging from 60 to 100 μm is uniformly spread on the NiTi alloy substrate with a powder spreading device; then the NiTi alloy substrate is adjusted, the sliced data files are imported into the forming equipment, the process parameters are set and the settings are saved; place NiTiHf alloy powder in the powder bin of the laser powder bed fusion equipment, seal the molding chamber, pump the molding chamber to less than 0.6 mbar with a vacuum pump, and send high-purity protective argon into the molding chamber until the oxygen content in the molding chamber is reduced to less than 0.1%. The laser starts printing according to the designed slice shape and laser scanning strategy; for each layer of powder (40 μm) in the first and second layers, the forming substrate drops by one layer of powder thickness (40 μm), and the laser melts the alloy powder twice per layer according to the set process parameters. Starting from the third layer, each layer of powder is melted by laser only once, and then the same thickness of powder is pre-set on the melted layer, and is melted again by the laser; the above steps are repeated until the preset size and shape of the alloy block are reached. The cooled shaped parts are cut from the substrate to obtain the formed alloy samples.

Figure 3:
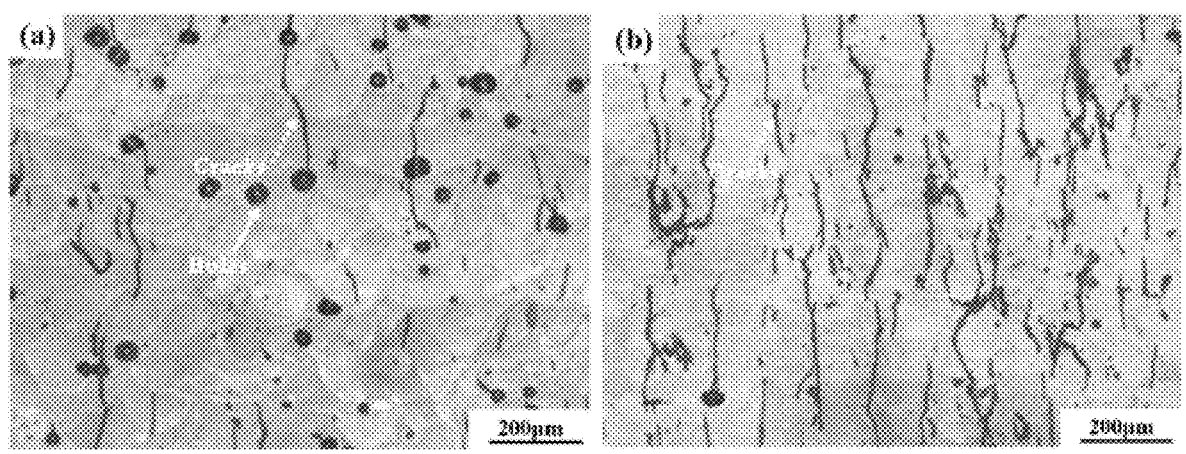
FIG. 3 is the optical topography of the NiTiHf high temperature shape memory alloy with two-way shape memory effect prepared by 4D printing in Comparative Example 1 and Comparative Example 2. (a) in FIG. 3 is Comparative Example 1, and (b) in FIG. 3 is Comparative Example 2.

The surface of the NiTiHf alloy sample formed in Comparative Example 1 was polished, and its density was measured by the Archimedes drainage method (ASTM B962-2017). Metallographic Microscopic Analysis of Specimens was carried out using a optical microscope LEICA DM 15000M. The phase transformation temperature test was carried out using a differential scanning calorimeter NETZSCH DSC 3500 SIRIUS according to the international standard ASTM F2004-17. The room temperature compression test was performed using a universal material testing machine INSTRON 5967 according to the national standard GB/T 7314-2017 to examine mechanical properties. The results show that the density of the NiTiHf alloy prepared by 4D printing technology in Comparative Example 1 is 96.5%, and there are obvious holes and a large number of microcracks in the vertical molten pool in the alloy; the end temperature of austenite transformation $A_f$ is 320° C. The tensile breaking strength is only 150 MPa. As shown in FIG. 3, the optical structure and properties of the NiTiHf alloy prepared in Embodiment 1 are very different.

Comparative Example 2

(1) Powder processing: the ingredients are prepared according to the following NiTiHf atomic ratio: Ni 50.4 at. %, Ti 29.6 at. %, Hf 20 at. %. The NiTiHf alloy rods were smelted by suspension under vacuum conditions. The NiTiHf alloy bar was heated to 1650° C. by electrode induction using the EIGA crucibleless electrode induction-melting gas atomization pulverizing equipment, and the alloy bar was atomized under the conditions of argon atomization pressure of 5 MPa and air supply pressure of 0.15 MPa. The obtained powder is collected and sieved to obtain an alloy powder with a particle size of 15 to 75 μm.

(2) Constructing a model and preheating a substrate: use 3D printing software MATERIALISE MAGICS 25.0 to build the 3D model of the required structural parts and the slicing tool BUILDPROCESSOR module to complete the slicing process and generate print files; the atomic percent element composition of the NiTi alloy substrate is: Ni 50.3 at. %, the remainder is Ti. The phase transformation temperature $A_f$ is 20±3° C., and the substrate preheating temperature is 250° C.

(3) forming a 4D printing: laser powder bed fusion equipment EOSINT M280 is used for 4D printing forming. The process parameters are as follow: laser power P=45 W, laser scanning speed v=100 mm/s, laser scanning distance h=80 μm, thickness of the powder layer t=30 μm, and the scanning strategy is a 670 rotation between layers. The specific forming steps are as follows: after the substrate is preheated to the target temperature, it is leveled, and then NiTiHf alloy powder with a thickness ranging from 60 to 100 μm is uniformly spread on the NiTi alloy substrate with a powder spreading device; then the NiTi alloy substrate is adjusted, the sliced data files are imported into the forming equipment, the process parameters are set and the settings are saved; place NiTiHf alloy powder in the powder bin of the laser powder bed fusion equipment, seal the molding chamber, pump the molding chamber to less than 0.6 mbar with a vacuum pump, and send high-purity protective argon into the molding chamber until the oxygen content in the molding chamber is reduced to less than 0.1%. The laser starts printing according to the designed slice shape and laser scanning strategy; for each layer of powder (30 μm) in the first and second layers, the forming substrate drops by one layer of powder thickness (30 μm), and the laser melts the alloy powder twice per layer according to the set process parameters. Starting from the third layer, each layer of powder is melted by laser only once, and then the same thickness of powder is pre-set on the melted layer, and is melted again by the laser; the above steps are repeated until the preset size and shape of the alloy block are reached. The cooled shaped parts are cut from the substrate to obtain the formed alloy samples.

The surface of the NiTiHf alloy sample formed in Comparative Example 2 was polished, and its density was measured by the Archimedes drainage method (ASTM B962-2017). Metallographic Microscopic Analysis of Specimens was carried out using a optical microscope LEICA DM 15000M. The phase transformation temperature test was carried out using a differential scanning calorimeter NETZSCH DSC 3500 SIRIUS according to the international standard ASTM F2004-17. The room temperature compression test was performed using a universal material testing machine INSTRON 5967 according to the national standard GB/T 7314-2017 to examine mechanical properties. The results show that the density of the NiTiHf alloy prepared by 4D printing technology in Comparative Example 1 is 98.5%, and significant unwelded cracks are present in the alloy; the end temperature of austenite transformation $A_f$ is 308.4° C. The tensile breaking strength is only 220 MPa. As shown in FIG. 3, the optical structure and properties of the NiTiHf alloy prepared in Embodiment 2 are very different.

The above-mentioned embodiments are preferred embodiments of the present invention, but the embodiments of the present invention are not limited by the above-mentioned embodiments, and any other changes, modifications, substitutions, combinations, simplifications should be equivalent replacement manners, which are all included in the protection scope of the present invention.

The invention claimed is:

1. A 4D printing method of NiTiHf high temperature shape memory alloy comprising:
   (1) powder processing: preparing and vacuum smelting high-purity titanium, high-purity nickel and high-purity crystalline hafnium according to a selected atomic percentage to obtain NiTiHf alloy rods, preparing NiTiHf alloy powder by an electrode induction-melting gas atomization method or a plasma rotating electrode atomization method, and sieving to obtain NiTiHf alloy powder with a selected size range;
   (2) constructing a model and preheating a substrate: building a three-dimensional model of structural parts to be prepared, completing a slicing process and generating a print file; the substrate is a NiTi alloy substrate and preheating the NiTi alloy substrate;
   (3) forming by 4D printing: forming a NiTiHf high temperature shape memory alloy with a two-way shape memory effect by utilizing the NiTiHf alloy powder sieved in step (1) through a laser powder bed fusion 4D printing additive manufacturing with a laser power of 45 to 100 W and a scanning speed of 100 to 200 mm/s, or by an electron beam powder bed fusion 4D printing additive manufacturing with a substrate preheat temperature of 300 to 500° C.;

wherein in step (3), a size of NiTiHf alloy powder suitable for the electron beam powder bed fusion 4D printing additive manufacturing is 50 to 120 m.

2. The 4D printing method of NiTiHf high temperature shape memory alloy according to claim 1, wherein the selected atomic percentage of the NiTiHf alloy rods in step (1) is: Ni 50.1 to 52.5 at. %, Hf 19.0 to 22.5 at. %, and a remaining is Ti.

3. The 4D printing method of NiTiHf high temperature shape memory alloy according to claim 1, wherein the electrode induction-melting gas atomization method in step (1) is as follows:

heating the NiTiHf alloy rods to between 1450 to 1750° C. by an electrode induction;

obtaining the NiTiHf alloy powder by atomizing the NiTiHf alloy rods with high-purity argon gas, an atomization pressure is 2.5 to 4.5 MPa, a supplemental gas pressure is 0.05 to 0.2 MPa, the atomizing gas temperature is 30 to 45° C., a melting power is 15 to 25 kW, and an entire environment is protected by argon.

4. The 4D printing method of NiTiHf high temperature shape memory alloy according to claim 1, wherein the plasma rotating electrode atomization method in step (1) is:

melting the NiTiHf alloy rods by a high temperature plasma arc, obtaining the NiTiHf alloy powder by atomizing the melted NiTiHf alloy rods, a rotating speed of an electrode rod is 18000 to 24000 r/min, a plasma arc current intensity is 1500 to 2000 A, a feed rate is 0.8 to 1.2 mm/s, high-purity argon is used as an atomizing medium.

5. The 4D printing method of NiTiHf high temperature shape memory alloy according to claim 1, wherein in step (3), a size of NiTiHf alloy powder suitable for the laser powder bed fusion 4D printing additive manufacturing is 15 to 75 μm, a preheating temperature of the substrate is 150 to 350° C.

6. The 4D printing method of NiTiHf high temperature shape memory alloy according to claim 1, wherein process conditions of the laser powder bed fusion 4D printing additive manufacturing in step (3) are: a laser scanning spacing of 60 to 100 μm, a powder layer thickness of 20 to 50 μm, and a scanning strategy of 67° to 90° rotation between layers.

7. The 4D printing method of NiTiHf high temperature shape memory alloy according to claim 1, wherein process conditions of the electron beam powder bed fusion 4D printing additive manufacturing in step (3) are: an accelerating voltage of 60 to 80 kV, a scanning current 15 of 25 mA, a scanning spacing 150 to 250 μm, a powder layer thickness of 50 to 100 μm, a scanning rate 800 to 1300 mm/s, and a scanning strategy of 67° to 90° rotation between layers.

* * * * *